INVENTORS.
Thomas J. Kearney &
John H. Nuber,
BY Paul & Paul
ATTORNEYS.

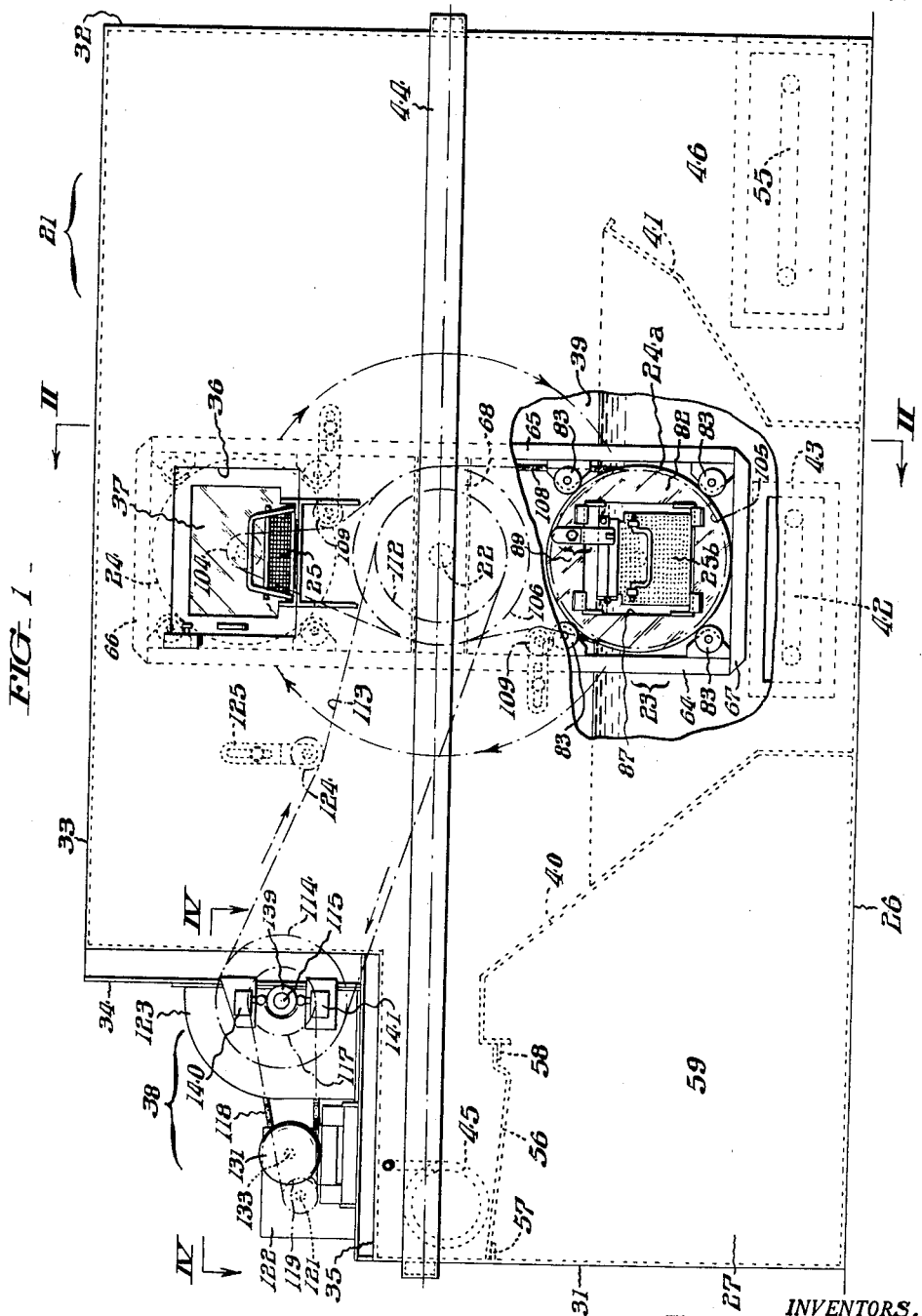

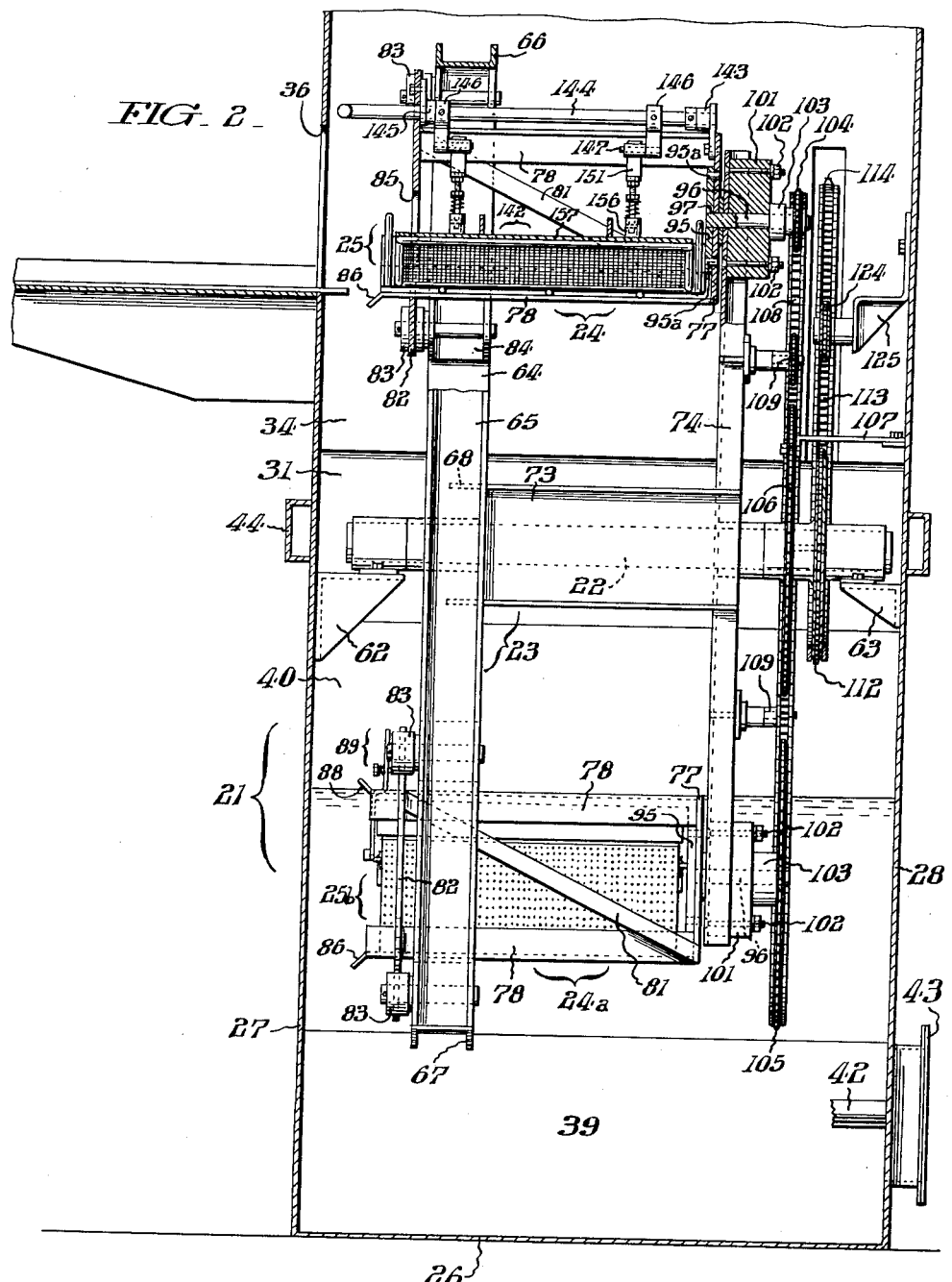

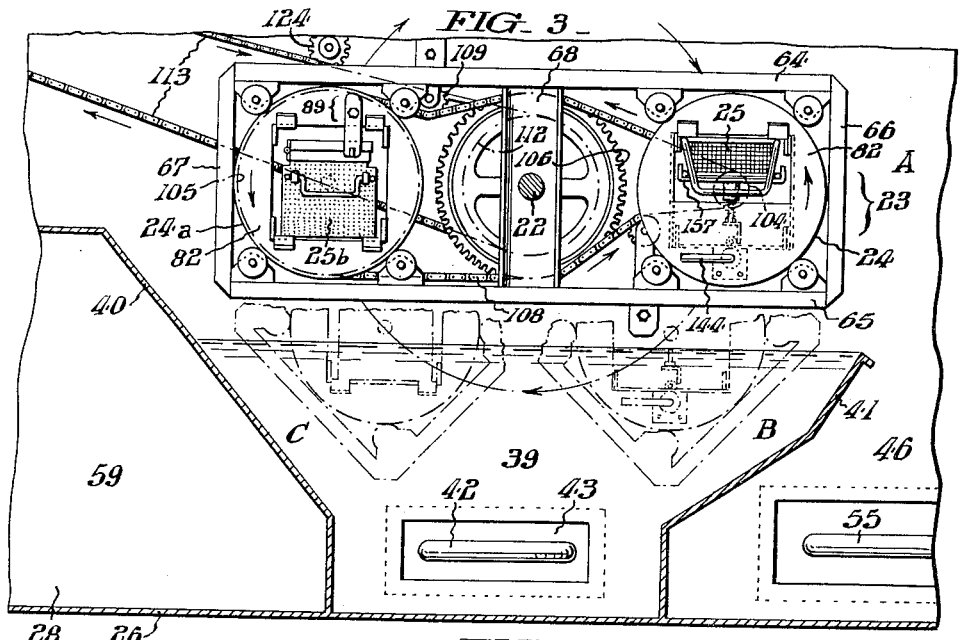
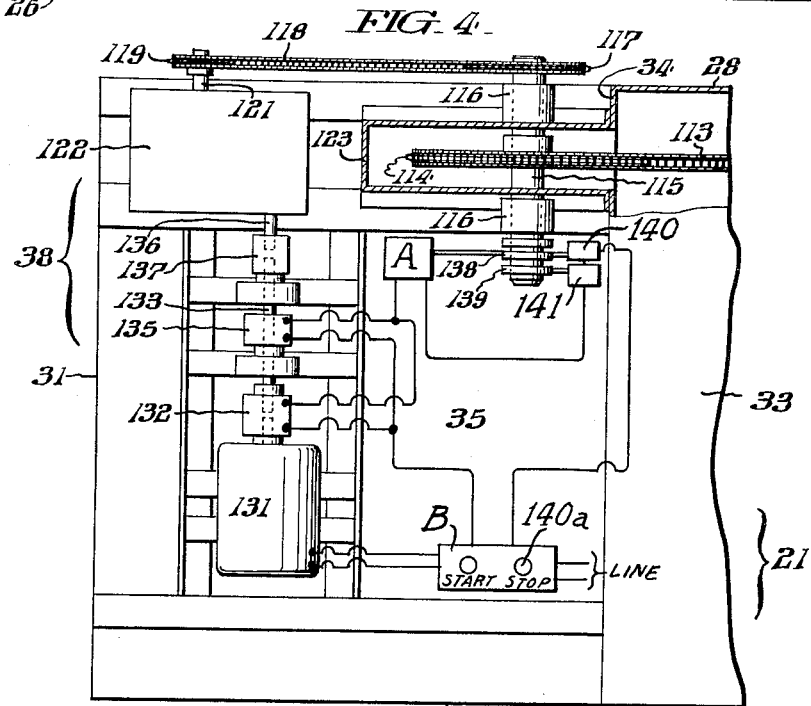

April 17, 1962 T. J. KEARNEY ETAL 3,029,929
APPARATUS FOR TREATMENT WITH SOLVENTS
Original Filed June 6, 1955 6 Sheets-Sheet 5
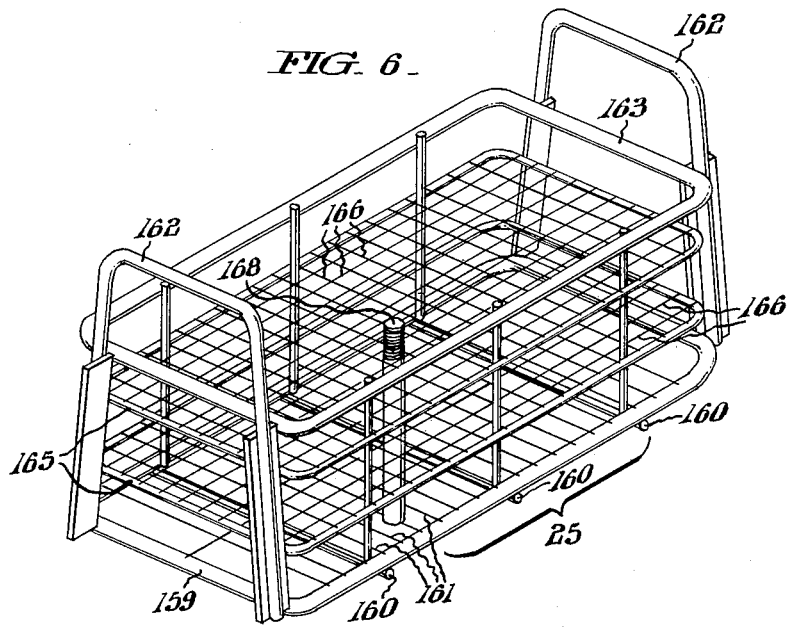
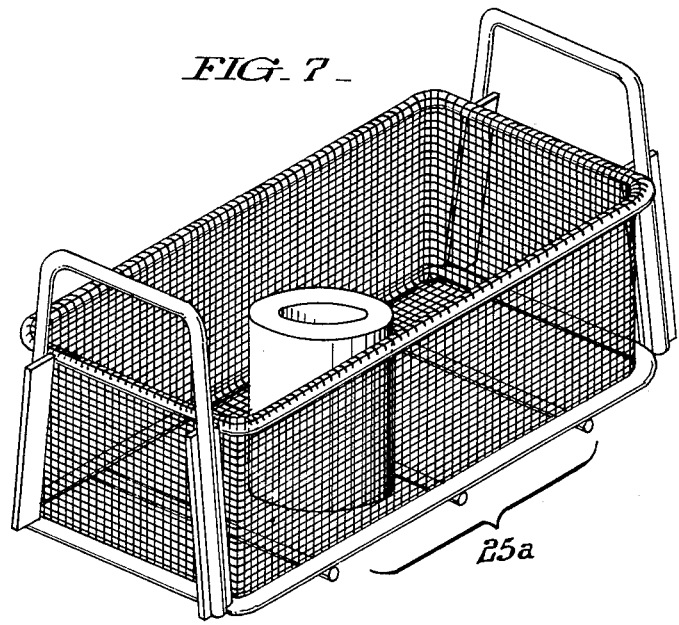
INVENTORS.
Thomas J. Kearney &
John H. Nuber,
BY Paul & Paul
ATTORNEYS.

April 17, 1962 T. J. KEARNEY ETAL 3,029,929
APPARATUS FOR TREATMENT WITH SOLVENTS
Original Filed June 6, 1955 6 Sheets-Sheet 6
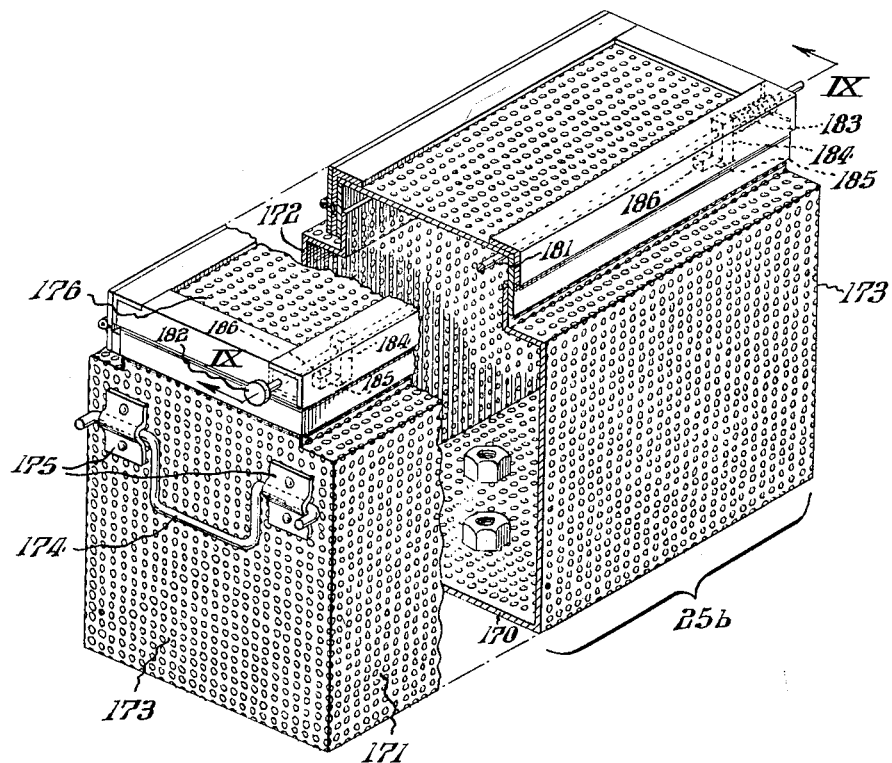
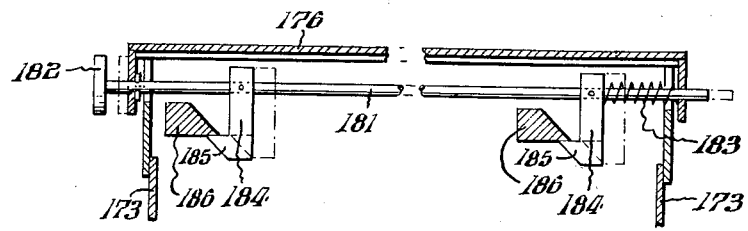
INVENTORS.
Thomas J. Kearney &
John H. Nuber,
BY Paul & Paul
ATTORNEYS.

United States Patent Office 3,029,929
Patented Apr. 17, 1962

---

3,029,929
APPARATUS FOR TREATMENT WITH SOLVENTS
Thomas J. Kearney, Detroit, Mich., and John H. Nuber, Ashtabula, Ohio, assignors to Detrex Chemical Industries, Inc., a corporation of Michigan
Original application June 6, 1955, Ser. No. 513,464, now Patent No. 2,924,229, dated Feb. 9, 1960. Divided and this application Jan. 29, 1960, Ser. No. 5,394
5 Claims. (Cl. 198—211)

This application is a division of our copending application Serial No. 513,464, filed June 6, 1955, now Patent No. 2,924,229, entitled Apparatus for Treatment With Solvents, which issued as U.S. Patent 2,924,229 on February 9, 1960.

This invention relates to apparatus for treatment with solvents, and more specifically to a degreasing machine, especially of the type having a rotatable frame which carries work objects up and down inside an enclosure which contains liquid, vapor or both.

One degreaser of this general type is disclosed and claimed in U.S. Patent No. 2,673,835, granted March 30, 1954, to Thomas J. Kearney. The apparatus shown in the drawings of that patent has an enclosure in which the degreasing operation is performed, and has a door through which the work objects are inserted into and withdrawn from the enclosure.

Another degreaser of this general type is disclosed and claimed in U.S. Patent application No. 427,756, filed on May 5, 1954, now patent No. 2,808,064, by Thomas J. Kearney. Neither the aforesaid patent nor application provide mechanism. whereby either the work object or the work carrier can be rotated during the rotation of the rotatable frame. Accordingly, it is an object of this invention to provide means for rotating the work object and the work carrier during the rotation of the rotatable frame, thereby assisting in the cleaning of the work object and in draining the liquid therefrom. Another object of this invention is to provide a carrier which will accept either a basket of bulk work, or a large individual work piece which can be clamped and restrained within the carrier. Another object is to provide mounted on the rotatable frame a carrier which can revolve on its own axis as the rotatable frame revolves about the central shaft of the machine. Another object is to provide a work carrier provided with a clamping mechanism whereby a conventional work basket, work tray or tote pan, may be placed in the work carrier, said work basket, work tray or tote pan being retained against displacement by the said clamping mechanism. It is another object to provide an apparatus that will make it unnecessary to transfer work objects which require rotation for proper cleaning and drainage from said work objects' normal handling tray into special trays for rotation. It is a further object to provide apparatus whereby the carrier may be rotated in such a manner that the bottom of said carrier remains horizontal during the rotation of the rotatable frame.

Another object of this invention is to provide apparatus whereby one carrier may be rotated about its axis at a different speed of rotation from that of another carrier mounted on the same rotatable frame. It is another object to provide at very nominal and economical cost a degreaser with a high degree of flexibility especially designed to accommodate various types of work, some of which require rotation of the work object for proper cleaning, and some of which cannot be rotated. It is another object to provide degreasing apparatus which is small, compact, economical, and has no solvent carry out. It is another object to provide degreasing apparatus for cleaning machine parts, assembly machine screw parts, or the like, which have outside threads and so cannot be rotated in bulk because of the possible damage to these threaded surfaces, but yet require rotation for proper cleaning and drainage.

Other objects and advantages of the invention will further become apparent hereinafter and in the drawings whereof:

FIG. 1 represents a front view of a degreasing machine which embodies features of this invention, the lower portion of the front wall of the degreaser being broken away in order more particularly to illustrate important details;

FIG. 2 represents a sectional view taken as indicated by the lines and arrows II—II which appear in FIG. 1;

FIG. 3 represents a front view of the degreasing machine, within the front wall of the housing and illustrates the position of the carriers during rotation of the rotatable frame;

FIG. 4 represents a plan view of the driving means of the rotatable frame taken as indicated by the lines and arrows IV—IV which appear in FIG. 1;

FIG. 6 is a perspective view of a partition type basket;

FIG. 7 is a perspective view of a pan type basket;

FIG. 8 is a perspective view, partly cut away, of a bulk type basket, one for carrying small items in bulk such as the nuts illustrated; and FIG. 9 is a sectional view of the latching mechanism of the bulk type basket cover taken as indicated by the lines and arrows IX—IX which appear in FIG. 8.

Figure 5:
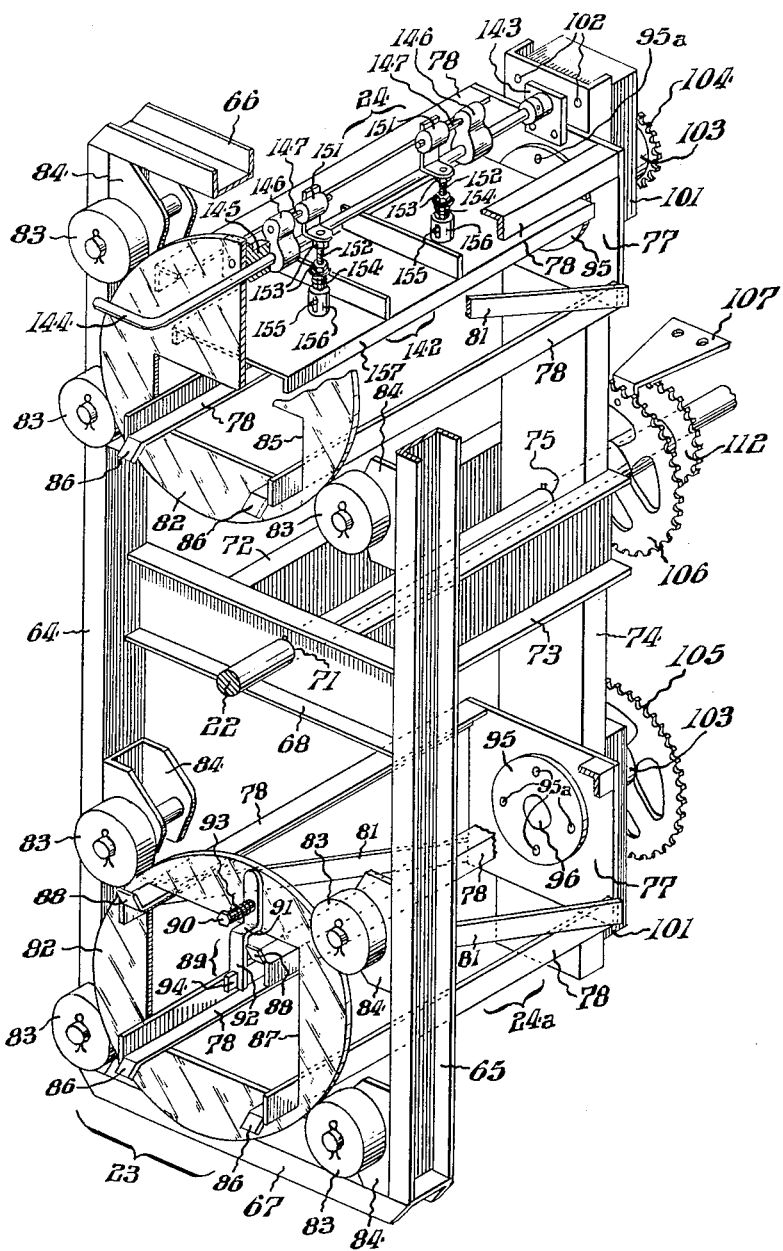
FIG. 5 is a perspective view of the rotatable frame, portions being broken away in order more particularly to illustrate important details.

Referring to the drawings, the machine has an enclosure 21 wherein a central shaft 22 is rotatably supported and within which the work objects to be treated are processed. Central shaft 22 supports a rotatable frame 23 which in turn supports work carriers, the carriers being of two types designated 24 and 24a. The work objects to be treated are placed in baskets 25, 25a or 25b, supported within carriers 24 or 24a and carried thereby through the treating cycle in a manner further to be described.

The enclosure 21 comprises a bottom 26, a front wall 27, a rear wall 28, side walls 31 and 32, a top 33, a drive mechanism side wall 34 and a drive mechanism floor 35. Enclosure 21 has but one opening 36 which is located in front wall 27 and which is of sufficient size to permit the entrance and exit of the baskets containing the work to be treated. A door 37 is provided to cover opening 36 when the apparatus is in operation. The numeral 38 designates a drive mechanism for the apparatus, said drive mechanism being mounted outside enclosure 21.

Within enclosure 21 is a treating chamber 39 defined by chamber walls 40 and 41, front wall 27 and rear wall 28. Chamber 39 has located near the bottom thereof a steam coil 42 which is mounted on a removable clean-out door 43. Chamber 39 is normally filled to the top of chamber wall 41 with a chlorinated hydrocarbon solvent, such as trichlorethylene, perchlorethylene or methylene chloride.

Completely surrounding enclosure 21 is a cooling jacket 44 through which is circulated a suitable coolant such as water. This cooling jacket 44 is located above the surface of the liquid in chamber 39.

At one end of enclosure 21 is located a spirally wound condenser coil 45 and a coolant flows through said condenser coil 45. Water jacket 44 and condenser coil 45 serve to condense the vapors emitted from a well 46. Well 46 contains liquid solvent which is boiled through the action of a steam coil 55.

The condensate from coil 45 is collected in a condensate pan 56 positioned immediately below condenser coil 45. Said condensate pan 56 rests upon a ledge 57 affixed to side wall 31 and a ledge 58 projecting from chamber wall 40. The condensate collected is piped from condensate pan 56 to a water separator (not shown) located outside enclosure 21 and then returned to the chamber 39. The solvent in chamber 39 normally overflows into boiling well 46 over the dam formed by chamber wall 41. The solvent is boiled in well 46 and the vapors emitted therefrom are condensed by jacket 44 and condenser coil 45 and collected in condensate pan 56, thus completing and maintaining a continuous solvent cycle within the apparatus.

Chamber wall 40, bottom 26 and side wall 31 form a solvent storage tank 59 entirely within enclosure 21 of sufficient capacity to retain the entire solvent contents of treating chamber 39 and boiling well 46 when they are emptied for maintenance or cleaning. Storage tank 59 is filled by diverting the condensate from the water separator to the storage tank instead of returning the condensate to chamber 39.

Referring more particularly to FIGS. 2 and 5, central shaft 22 is supported in a horizontal position upon front angle bracket 62 which is affixed to front wall 27, and upon rear angle bracket 63 projecting from back wall 28. Mounted upon central shaft 22 is a rotatable frame, designated generally by the numeral 23, comprising spaced oppositely facing vertical channels 64 and 65 joined at their ends by spaced oppositely facing horizontal channels 66 and 67 to form a rectangle. Welded between the vertical channels 64 and 65 midway of their length is a horizontal channel 68 having an aperture 71 therein which is keyed to central shaft 22. Extending rearwardly and horizontally from channel 68 in parallel relationship to central shaft 22 are a pair of oppositely facing channels 72 and 73 which are permanently affixed at their distal ends to the sides of a broad vertical channel 74. Channel 74 has an opening 75 which is keyed to central shaft 22. Channels 64, 65, 66, 67, 68, 72, 73, 74 and central shaft 22 are all joined together to form a rigid structure which is rotatable about the axis of central shaft 22.

Mounted at the top and bottom of rotatable frame 23 are the carriers. These carriers are of two general types, the numeral 24 designating the clamping carrier illustrated at the top of FIGS. 2 and 5, and the numeral 24a designating the standard carrier illustrated at the bottom of FIGS. 2 and 5. Standard carrier 24a is designed to accommodate the bulb type basket 25b (FIG. 8), while the clamping carrier 24a is designed to accommodate a partition type basket 25 (FIG. 6) or open type basket 25a (FIG. 7). Similar parts of carriers 24 and 24a are designated by the same number.

Carrier 24 comprises a square base plate 77 having angles 78 extending horizontally from each corner with slanting brace members 81 lending rigidity thereto. The distal end of angles 78 are attached to a plate ring 82 which is supported on four rollers 83. Rollers 83 are pivotally mounted on brackets 84 which are welded to channels 64 and 65 of rotatable frame 23.

The upper angles 78 of work carrier 24 have their ends welded to the rear surface of plate ring 82 while the lower angles 78 of said carrier 24 extend through a rectangular shaped aperture 85 formed in plate ring 82. Aperture 85 permits access and removal of the baskets 25 or 25a. The ends of the lower angles 78 of work carrier 24 have guide tongues 86 extending downwardly therefrom at an angle to permit easy insertion of the basket into the carrier.

Both the upper and lower angles 78 of work carrier 24a have their ends extending through an aperture 87 in plate ring 82. Aperture 87 is more of a square shape to permit access and removal of basket 25b which is deeper than baskets 25 and 25a. As in work carrier 24, the lower angles 78 of work carrier 24a have guide tongues 86 extending downwardly therefrom, but, unlike carrier 24, the upper angles 78 have guide tongues 88 extending upwardly therefrom to further assist in the easy insertion of basket 25b into carrier 24a.

Work carrier 24a is provided with a latching member 89 which prevents displacement of the basket 25b within the work carrier. Latch member 89 is pivotally connected to plate ring 82 by bolt 90. The middle portion of latch member 89 is bent horizontally as at 91 and the outer end is bent downwardly as at 92 to form a shoulder for engaging behind the end of the basket 25b after it has been inserted into work carrier 24a. Spring 93 surrounding bolt 90 urges latching member 89 yieldingly toward plate ring 82 to maintain basket 25b in its proper position. A knob 94 is provided on the downwardly bent end portion 92 of latch member 89 to facilitate the turning of the latch member about bolt 90 while the basket is being inserted or withdrawn from the carrier.

Base plate 77 has rotation imparted to it by means of four pins 95a securely fastened to a circular support 95. A carrier shaft 96 extends from support 95 through a circular aperture 97 in base plate 77. Carrier shaft 96 is supported in position by pillow blocks 101 (FIG. 2) which are secured to vertical channel 74 by bolts 102. The carrier shaft 96 is freely rotatable in pillow blocks 101 and longitudinal displacement of the shaft is prevented by a shoulder 103 on the carrier shaft which abuts the vertical outside surface of the pillow blocks. A sprocket 104 is mounted on the distal end of shaft 96 of carrier 24 and a sprocket 105 is mounted on the distal end of shaft 96 of carrier 24a. Rotation of the sprocket 104 rotates work carrier 24 and rotation of sprocket 105 rotates work carrier 24a.

Central shaft 22 has mounted at one end a fixed sprocket 106 which is in vertical alignment with sprockets 104 and 105. Sprocket 106 is fixed by means of bracket 107 to back wall 28 of enclosure 21 and central shaft 22 is freely rotatable within fixed sprocket 106. A continuous roller chain 108 engages the teeth of sprockets 104, 105 and 106. Chain tighteners 109 are provided to keep proper tension on the chain 108. Rotation of rotatable frame 23 will cause rotation of sprackets 104, 105 and, since the ratio of teeth between sprockets 104 and 106 is one to six, will cause carrier 24 to rotate six times during one revolution of rotating frame 23.

Keyed to central shaft 22 is a sprocket 112 which is part of the driving mechanism of the apparatus. Sprocket 112 is driven through a continuous roller chain 113 by a sprocket 114. Sprocket 114 is mounted on a jack shaft 115 (FIG. 4), said jack shaft 115 being supported by two ball bearing pillow blocks 116 mounted upon drive mechanism floor 35. Also mounted upon jack shaft 115 is a roller chain sprocket 117 which is driven by a roller chain 118 mounted upon a 15 tooth roller chain drive sprocket 119 of output shaft 121 of a gear reducer 122. Roller chain 113 is provided with a chain guard 123 bolted and gasketed solvent tight to drive mechanism side wall 34 and floor 35. Roller chain 113 is kept taut by a chain tightener 124 (FIG. 1) extending from bracket 125 fixed to rear wall 28.

The drive means for the apparatus is shown in more particular detail in FIG. 4 which is a view of the apparatus in plan. The numeral 131 designates a continuous running motor which is connected and disconnected to the driving apparatus by means of a clutch coupling 132. Clutch coupling 132 is mounted on a clutch and brake shaft 133 together with an electric brake 135 which is part of the mechanism provided to stop the carriers in exact position for loading and unloading. Connecting the clutch and brake shaft 133 to a gear reducer high speed shaft 136 is a coupling 137.

Mounted on the end of jack shaft 115 are two set collar cams 138 and 139, which are set 180° apart and engage limit switches 140, 141 (FIG. 1) which actuate the clutch 132 and brake 135 mechanism to bring the rotatable frame 23 to a stop in the load-unload position.

Said collar cams 138, 139 are adjustable so that precision locating of the rotatable frame can be accomplished. Collar cam 138 operates a timing mechanism A to hold the work object for a period of approximately five to ten seconds at a position just above the vapors thus allowing any possible entrapped vapors to escape from the work object and to be retained within the machine before the work object is brought up to the unload position. The rotatable frame 23 is started in its rotation upon the operator depressing a start button at the start-stop station B. A stop button 140 allows the operator to stop rotation of the work frame 23 at any time in an emergency.

In order to keep the work objects from falling from partition type baskets 25 and open type baskets 25a, a clamping mechanism designated generally by the numeral 142 is provided for carrier 24 (FIGS. 2 and 5). Clamping mechanism 142 comprises a bracket 143 which is riveted to base plate 77 at the top thereof and from which extends horizontally an elongated crank handle 144, the crank end of which is rotatably supported in bracket 145 which is affixed to plate ring 82. Mounted upon handle 144 are a pair of spaced levers 146. Levers 146 have extending therefrom a pin 147 which carries a bracket 151, pin 147 being freely rotatable in bracket 151. Bracket 151 has extending downwardly therefrom a bolt 152, associated nuts 153, a spring 154 and a pin 155. Bolt 152 has its pin 155 slideably positioned within a slotted head 156, the latter being fixed to a shallow channel shaped cover plate 157. Upon insertion of the uncovered baskets 25 or 25a into carrier 24, handle 144 is turned 180° from the horizontal position shown in FIG. 5 to the horizontal position shown in FIG. 2, thus closing the cover on the basket and preventing the work objects from falling from the basket during its rotation.

FIG. 6 shows a partition type basket 25 particularly designed for work objects having outside threads, said baskets 25 being adapted for rotation without permitting work objects in the basket to contact each other, thus avoiding damage resulting from said contact. As is shown, the partition type work basket 25 has a rectangular shaped rod frame 159 as bottom member with three spaced horizontally positioned rods 160 welded thereto for support. Frame 159 is spanned by wires 161 in a cross-hatch fashion to form a bottom upon which the work objects rest. Extending upwardly from frame 159 are the end components 162 of the work basket which are of inverted U shape thus providing handles as well as vertical support. A rectangularly shaped rod is welded to end components 162 in parallel relationship to the bottom 159 to form a top member 163 of the work basket. Intermediate the top and bottom members of the work basket are two basket layers 165 which are cross-hatched by wires 166 to form vertically aligned openings which give support to the independently supported work objects such as is illustrated in FIG. 6 by the threaded bolt 168.

FIG. 7 shows open type basket 25a made of wire mesh used for the processing of large work objects. Here the carrier, basket and work object may be rotated during the rotatable frame cycle, the work object being clamped into place by carrier clamping mechanism 142.

FIG. 8 represents bulk load basket 25b particularly suited for bulk loads of small items, such as internally threaded nuts, which may be tumbled without damage to the machined parts. The bulk load basket 25b has a bottom 170, a front wall 171, a rear wall 172 and end walls 173, all preferably of substantially foraminous material. Handles 174 are attached to the end walls 173 and are pivoted within brackets 175 mounted on the outside of said walls. A hinged top 176 is provided, the latching mechanism of which is most clearly shown in FIG. 9. The latching mechanism includes a rod 181 with a push-button 182 at one end thereof and a compression spring 183 at the other. A pair of spaced arms 184 depend from rod 181, each of said arms having a flange portion 185 which is adapted to engage beneath an associated fixed catch 186 and to remain so engaged by operation of the spring 183. Pushing of button 182 operates to release the latch and permit opening top 176 for insertion or removal of work objects from the interior of basket 25b.

In FIG. 1 the carrier 24 is shown at the start-stop or load-unload position with rotatable frame 23 in vertical position. In one embodiment of the invention the sprocket 104 associated with carrier 24 has 16 teeth while fixed sprocket 106 has 96 teeth, a tooth ratio of 1 to 6. The carrier 24 will rotate 6 times about its axis of rotation while the rotatable frame rotates once. FIG. 3 illustrates this 1 to 6 tooth ratio embodiment. At position A the carrier is upside down having rotated 1½ times. In position B (dot-dash lines) the carrier has rotated 2½ times, and in position C (dot-dash lines) the carrier has rotated 4 times.

Carrier 24a in FIGS. 3 and 5 has 96 teeth on its associated sprocket 105, the same number of teeth as the fixed sprocket 106. The tooth ratio between sprockets 105 and 106 being 1 to 1, carrier 24a will rotate once for each rotation of rotatable frame 23, so that the bottom 170 of the basket 25b illustrated in FIGS. 3 and 5 will remain horizontal during rotation of rotatable frame 23.

From the foregoing description the operation of the apparatus will readily be apparent. Assuming the apparatus elements with the machine are stationary, that the chambers 39, 46 are filled to the proper levels with solvent at the desired temperatures, and that coolant is flowing through the cooling jacket 44 and condenser coil 45, the operator slides the door 37 to a fully open position and inserts a work basket containing work to be cleaned into the carrier 24. The door 37 is closed and the start switch is depressed. This engages the motor clutch coupling 132 thereby starting the rotation of rotatable frame 23. Rotation of frame 23 through the action of fixed sprocket 106, carrier sprockets 104 and 105 and associated sprocket chain 108 causes the rotation of the work carriers during the rotation of rotatable frame 23. Action of the cam 138 causes a short stay of the work carrier after the rotatable frame 23 has completed most of its rotation as hereinbefore explained, and then the work basket returns to the loading and unloading position, is stopped, the door opened and the work basket removed from the carrier. Thus each work object to be cleaned is carried through and subjected to a vapor treatment, and immersed in hot solvent, then removed from the solvent and subjected to further vapor treatment, then raised above the level of water jacket 44 and condenser tubes 45 for draining and evaporation of solvent, and eventually removed from the apparatus.

It will be apparent that various modifications may be made in the form of the apparatus, including variation in the number and character of work carriers and modifications in the arrangement of the solvent chambers in relation to the arrangement and direction of movement of the rotatable frame. Moreover, it is to be understood that certain views of the invention may be used to advantage independently of the use of other features, all within the spirit and scope of the invention. Furthermore, the invention comprehends the substitution of the equivalent parts of those herein disclosed, and the reversal and rearrangement of elements for similar, or analogous purposes, and is not limited in scope except as expressly indicated in the claims.

Having described our invention, we claim:

1. A rotatable work object carrier adapted to be mounted for rotation in one end of a generally rectangular frame rotatable about a horizontal central axis, said carrier comprising substantially parallel upper and lower horizontal members, a vertically disposed circular disc rigidly connecting said upper and lower members at one end thereof, a vertically disposed supporting plate rigidly connecting said upper and lower members at the other end thereof, a relatively short horizontal shaft secured to said supporting plate, a plurality of rollers mounted on said frame for supporting said disc for rotation, pillow blocks mounted on said frame supporting said shaft for rotation, and drive means connected to the horizontal central axis of said rotatable frame for driving said shaft rotationally thereby to rotate said carrier within said frame at a speed which is a function of the speed of rotation of said frame.

2. A rotatable work object carrier for rotating within a rotatable rectangular frame, said carrier comprising substantially parallel upper and lower horizontal disposed members, a vertically disposed rotatable circular disc rigidly connecting said upper and lower members at one end thereof and forming one end of said carrier, a plurality of rollers mounted on said frame at spaced apart locations for supporting said circular disc for rotation relative to said frame, a vertically disposed end plate at the other end of said horizontally disposed members connecting said upper and lower members at said other end and forming the other end of said carrier, a relatively short horizontally disposed shaft secured to said vertically disposed end plate, means mounting said shaft in said frame for rotation with respect thereto, and means for rotating said shaft in response to rotation of said frame thereby to rotate said carrier, within said frame by driving rotationally said end plate, the circular disc at the one end of said carrier rotating on said supporting rollers.

3. Apparatus as claimed in claim 2 characterized in that said means for rotating said shaft in response to rotation of said frame comprise speed-changing means connecting said shaft to the axis of rotation of said frame for rotating said shaft at a speed which is an integral of the rotational speed of said frame.

4. Apparatus as claimed in claim 3 characterized in that said speed-changing means for rotating said shaft is adapted to rotate said shaft at a speed which is an integral multiple of the speed of rotation of said frame.

5. A work object carrier as claimed in claim 3 characterized in the provision of an access opening in said circular disc for providing access to the interior of said work carrier.

References Cited in the file of this patent

UNITED STATES PATENTS

| | | |
|---|---|---|
| 532,523 | Blakeslee | Jan. 15, 1895 |
| 2,227,067 | Cronk | Dec. 31, 1940 |
| 2,673,835 | Kearney | Mar. 30, 1954 |